United States Patent [19]

Hampel

[11] 4,013,747
[45] Mar. 22, 1977

[54] METHOD FOR MAKING SPECTACLE FRAME COMPONENTS

[75] Inventor: Gerald Hampel, Vienna, Austria

[73] Assignee: Optipatent AG, Zug, Switzerland

[22] Filed: Aug. 20, 1970

[21] Appl. No.: 65,654

Related U.S. Application Data

[63] Continuation-in-part of Ser. No. 689,952, Dec. 12, 1967, abandoned.

[30] Foreign Application Priority Data

Dec. 22, 1966 Germany .................... 1604419

[52] U.S. Cl. ................... 264/73; 260/37 EP; 260/47 EP; 264/234; 264/245; 264/331
[51] Int. Cl.² .................... B29C 9/00; C08G 51/04
[58] Field of Search ...... 264/171, 327, 168, 73–77, 264/245–247, 331, 234, 345–346, 22; 260/67 EP, 37 EP

[56] References Cited

UNITED STATES PATENTS

| | | | |
|---|---|---|---|
| 2,480,749 | 8/1949 | Marks | 264/22 |
| 2,511,024 | 6/1950 | Toulmin | 264/168 |
| 2,560,855 | 7/1951 | Flanagan | 18/1 FZ |
| 3,288,666 | 11/1966 | Dacey | 156/164 |
| 3,443,936 | 5/1969 | Menold | 264/22 |
| 3,513,060 | 5/1970 | Krystof | 264/171 |
| 3,678,141 | 7/1972 | Metcalfe et al. | 264/22 |

Primary Examiner—Jeffery R. Thurlow
Attorney, Agent, or Firm—Fitch, Even, Tabin & Luedeka

[57] ABSTRACT

A process for making spectacle frame components having reproducible color patterns by molding components using a polyepoxide, a curing agent therefor and an organic dye of a certain color, which dye is thermally degradable at a temperature between about 140° C. and 250° C. The molded solid component is subjected to differential heating in accordance with a first predetermined pattern to cause exposed portions to undergo a distinct change to a different color. A second dye may also be included that thermally degrades at a different temperature and the component then subjected to a second predetermined pattern at a temperature intermediate of the two degradation temperatures.

15 Claims, 6 Drawing Figures

INVENTOR:
Gerald Hampel,

BY
HIS ATTORNEY.

INVENTOR:
Gerald Hampel,

BY Ernest A. Marmorek,
HIS ATTORNEY

METHOD FOR MAKING SPECTACLE FRAME COMPONENTS

This application is a continuation-in-part of patent application Ser. No. 689,952, filed Dec. 12, 1967, now abandoned, and for which a priority date of Dec. 22, 1966 is claimed.

This invention relates to the production of spectacle frames from epoxy resins, and more particularly to processes for producing such spectacle frames which have reproducible color patterns.

A number of different methods have been employed to produce spectacle frames made of plastic materials having color patterns provided by different colored regions. Extrusion processes have been employed to produce profiles of marbled or veined appearance, as for example, by disposing hollow shafts within the extrusion channel of an extruder and injecting color pigments or dyes into the flowing stream of plastic materials. Patterns of marbled or veined appearance are also obtained by using an extrusion screw machine having a plurality of screw threads into which different dyes or pigments are fed.

To accomplish production of shaped bodies of plastic materials having distinctly delineated areas of different colors, it has been proposed to simultaneously extrude several plastic materials of different colors at adjacent locations and to then mix the desired amounts of the soft extrudates from adjacent extruders using a pressing operation.

Translucent thermoplastics, for example, cellulose esters and ethers, have been employed to produce spectacle frames having a pattern similar to that of tortoise shell, buffalo horn and other naturally appearing patterns. The method most frequently used employs milled sheets, approximately 2 cm. in width, that are suitably colored yellow and brown. The sheets are staggered in a pile and then fed several times through the narrow gap between a pair of mill rollers. The gap is gradually changed to produce a sheet about 4 cm. thick, which is then cut into strips. The strips are placed edgewise in a heated press and therein are formed into a round block. If it is desired to change the generally clouded pattern into one of spotted or veined design, the milled sheets may be stacked in a "shifting press". The sheets of plastic materials obtained behind the slot of the press are then wound onto a hollow core and pressed to a rounded block, from which sheet material showing the desired pattern may be peeled.

Other commercially available spectacle frames are made from two laminated layers of plastic material, one layer which is light colored and the other dark colored. One layer is partially removed in order to get a desired pattern. More recently, cast resins have been employed in continuously increasing amounts to produce spectacle frames components, i.e., frame for lenses, temple pieces, nose pieces, etc.

It has also recently been discovered that certain epoxy resin compositions make excellent material for spectacle frame components. It is desirable to be able to produce molded components of different shapes and different colors, and particularly to be able to delineate different colors in different regions of the components. In the past, different, unpatterned layers of thermoplastic material have been stacked in a grooved mold, and the laminated body is then compressed transversely to its longitudinal axis while being heated to a temperature sufficient to soften it. The compressed body is then cut into transverse disks, which are subsequently laid up, heated and pressed up into molds of desired shapes. However, such methods of making spectacle frames produce patterns which are accidental. It is inherently impossible to create reproducibility of pattern design in such a process. The initial lay-up or mixing gives rise to incidental patterns, and the appearance of final result is generally dependent upon the skill of the operator.

The production of a mottled effect in spectacle frames made of thermoplastics, for example, cellulose acetate, is time-consuming and expensive. It also suffers from the disadvantage that the locations of light and dark regions or spots in the final product are not reproducible. It has been attempted to produce such a mottled effect in spectacle frames using thermosetting resins by casting resins having different colors. However, the patterns of spectacle frames obtained from this particular method tend to show cloudy lines or streaks in the flow direction. But, it is not economically feasible to attempt to precisely control the locations of the light and dark areas.

It is an object of the present invention to provide an improved process for producing spectacle frames and component parts thereof having precisely reproducible color patterns. A further object is to provide an improved process for making epoxy resin spectacle frames having precisely reproducible color patterns which may extend throughout the depths of the frames. Other objects of the invention will be readily apparent from a reading of the following detailed description of several processes embodying various features of the invention.

It has been found that organic dyes which will be thermally degraded within a predetermined temperature range can be incorporated within an epoxy resin casting mixture from which spectacle frame components are molded or cast. The molded frame components can be cured to a solid, shape-retaining form at temperatures below those temperatures at which the organic dye will be affected. The cured spectacle frame is then subjected to a temperature differential to provide a desired pattern, using masking or some other method. The organic dye is degraded, or chemically bleached, in the regions of high temperature and undergoes a distinct change in color, which may be referred to as a demi-shade. The color of the lower temperature regions is unaffected. The dye used may turn essentially colorless or to a light color, such as a yellow. The temperature range at which the dye degrades should not be such as to affect the epoxy resin material. Customarily, the term "dye" is used to refer to water-soluble coloring agents and the term "pigment" to refer to coloring agents which are insoluble; however, for purposes of this application, the term "dye" is to include both dyes and pigments. By its nature, this process is capable of producing precise and reproducible patterns in spectacle frames.

Using the prior art processes, it is impossible to reproduce exactly a desired pattern, or control a marbled appearance and obtain a mottled effect in a precisely reproducible manner. Not only can a desired pattern be precisely obtained by this differential heating method, but also, by close control of the temperature, the intensity of the color change can be varied by varying the time-temperature interval to which the regions are subjected wherein the thermal degradation of the dye is occurring. Furthermore, by using two different colored dyes which degrade at different temperatures, a three-color effect can be achieved by using different masking patterns.

The differential heat treatment to create different-colored regions in the spectacle frames may be accomplished in various different ways. For example, a heat-conductive carrier may be used to transfer heat to the spectacle frames, and the resultant spectacle frames have a pattern in which the dye-degraded regions correspond to the particular shape of the conductive heat carrier. The shape of such a heat carrier may be profiled according to a predetermined pattern, and the profiled heat carrier will produce a predetermined gradation of temperatures across the abutting surface of the spectacle frame components. Such a temperature gradation results in a varying of the intensity of the color change in the dye so long as the time interval is properly controlled.

Another way of creating the temperature differential is to partially mask or shield the spectacle frame components to produce a given pattern and then heat the partially shielded bodies using either radiation and/or convection. Such a masking operation may have the advantage of permitting greater variations than are possible with a profiled heat carrier. In such a masking operation, the spectacle frames may be masked directly by placing a shield in contact with the frame surfaces, or a shield might be located at some predetermined distance spaced from the surface of the spectacle frames. In the former situation, the lines of demarcation between the regions which do not undergo a color change and those which do thermally degrade to a different color will be fairly sharp and exact. Whereas in the latter situation, the borders between adjacent regions of different colors will be somewhat gradual and/or blurred.

It is possible to move the spectacle frame components relative to the source of heat or relative to a shield, and movement can also be carried out relative to both the source of heat and the shield. Such movement facilitates production line methods. In these cases, the resultant patterns of the spectacle frame components are precisely reproducible if the path and speed of relative movement are exactly controlled. As can be seen, the resultant patterns are subject to many variations, all reproducible, because of the number of variables which can be changed.

Partial immersion of the spectacle frame components into heated liquids, of suitably high boiling point, can also be used. In such a process, the extent of color change will be dependent upon the depth and time of immersion. Of course, slowly inserting or slowly withdrawing the spectacle frame components from a heated liquid bath may be employed to achieve a gradation of intensity of color change. Examples of suitable liquids which might be employed include vegetable oils, mineral oils, asphalt, silicones, low melting point metals, and polyvalent alcohols. Glycerol is considered particularly suitable because it is economical in price, completely compatible with epoxy resins and can be removed using water.

As indicated above, a vast number of precisely reproducible patterns are possible by changing the regions wherein thermal degradation occurs and/or by varying the heat. Further variations are made possible by using two dyes which degrade to different colors at different temperatures. Moreover, the depth of the color change in the spectacle frames can also be varied. The temperatures reached by the central portion of the spectacle frame components need not be the same as the temperatures occurring at the surfaces. If sufficient time is employed, the heating will be generally uniform throughout the thickness of the components; however, by carefully controlling the heat treatment, color changes to lesser depths can be obtained if desired.

The precise amounts of heat which are transferred to the frame components, using any one of the aforementioned methods of heating, can be closely controlled. Of course, one of the main considerations is that the time-temperature intervals employed should not have any undesirable effect on the epoxy resin materials from which the spectacle frames are formed. In this respect, it is considered that the epoxy resin materials, which would likely be used, can be exposed to temperatures of up to about 300° C. for short intervals, for example up to about two minutes, without undesired effects. For longer time intervals, for example about three to six minutes, the temperatures employed should generally not exceed about 270° C. and are preferably maintained at about 250° C. or below.

If epoxy resins are heated for greater time-temperature intervals, many epoxy resins which are initially clear undergo a gradual yellowing. Whereas the occurrence of some yellowing is not considered to be detrimental to the physical properties of the epoxy resin, it may or may not be considered to be undesirable from the standpoint of the appearance or color characteristics desired in the eyeglass frames to be marketed. For example, if an organic dye is employed which changes to a yellowish color, perhaps some yellowing of the epoxy resin in the higher temperature regions may be quite acceptable. On the other hand, should an organic dye be used which changes to become substantially devoid of color, so that clear regions are produced in the spectacle frame components, then such a yellowing of the epoxy resin might be considered to be undesirable; and in such a situation, a temperature-time interval is chosen which avoids yellowing of the epoxy resin.

The color pattern of the spectacle frames should, of course, be totally unaffected by exposure to temperatures which will be encountered during normal wear, and also temperatures which might be encountered during the time when an optician is inserting the lenses or heating the spectacle frames in order to shape them to the face of the ultimate wearer. It is therefore contemplated that epoxy resins will be employed which soften in the range of approximately 65° C. to about 95° C. to permit such shaping to an individual's face, and the dyes employed should be stable within this temperature range, and preferably up to at least about 130° C.

Although, as previously indicated, organic dyes can be employed which have degradation temperatures nearly as high as those which are considered to be acceptable in respect of a particular epoxy resin used, preferably dyes are employed which undergo thermal degradation within the range of about 140° C. to about 200° C. Of course it should be recognized that it is the time-temperature interval which is important to accomplish thermal degradation, and a dye is usually not used which requires more than three minutes at 250° C. From a commercial production standpoint, the time interval employed will be as short as feasible with respect to the individual dye. Usually a suitable time-temperature equivalent is chosen wherein the time is as short as possible, generally two to three minutes, without approaching a temperature too close to that at which the color stability of the epoxy resin might be affected.

It is preferred that organic dyes are employed, as opposed to inorganic materials. Organic dyes are compatible with epoxy resins and are accordingly easily dispersible throughout the uncured resin components. Inorganic dyes and pigments generally change color by means of loss of water of crystallization, and the resultant presence of unbound water within the cured epoxy resin component produces a cloudiness that is considered generally undesirable. Organic dyes which are heat-sensitive and which undergo color changes at specific temperatures are known in the art, and any such suitable organic dyes can be employed which meet the aforementioned temperature requirement. For example, when translucent dyestuffs are desired, azo-type dyes are often employed. Heat-sensitive organic dyes are either destroyed or converted via a molecular rearrangement, thereby either changing or becoming colorless. Examples of individual dyes which are suitable for inclusion within epoxy resins to be used to mold eyeglass frames include: Solvent Red 19 (CI 26050), a diazo-type dye; Acid Red 68 (CI 17920), an azo-type dye; Pigment Violet 19 (CI 46500), a quinoline dye; Acid Blue 7 (CI 42080), a triarylmethane dye; Acid Blue 89 (CI 13405); Acid Red 154 (CI 24800); Pigment Red 7 (CI 12420); Pigment Red 58 (CI 15825); Acid Blue 113 (CI 26360); Acid Brown 2 (CI 17605); Pigment Red 31 (CI 12360); and Pigment Red 12 (CI 12385).

Processes for making spectacle frames embodying various features of the invention are hereinafter illustrated in conjunction with the accompanying drawings wherein.

Figure 1:
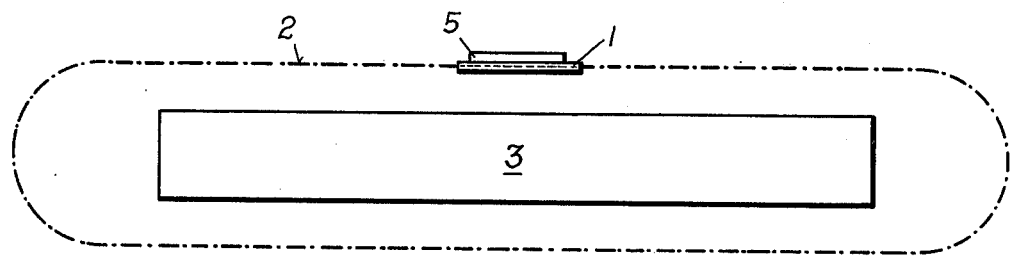
FIG. 1 is a schematic representation of apparatus employing radiation heating for the treatment of spectacle frame components.
Figure 2:
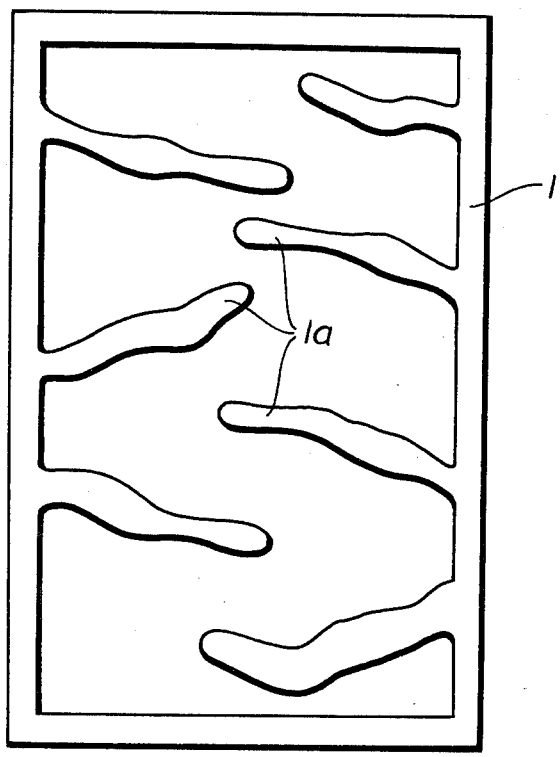
FIG. 2 is an enlarged front view of the shield shown in FIG. 1.

Depicted in FIG. 1 is a device which includes a central heating element 3 which serves as a radiation heat source. An endless conveyor chain 2 is arranged to travel around the heat source 3, and shields or masks 1 are affixed to the conveyor chain. Each mask is shaped to provide the pattern that is desired in the spectacle frame component. The mask 1, as seen in FIG. 2, is formed with an outer peripheral portion that is of a size greater than the frame to hold the lenses. A plurality of projections 1a extends inwardly from the peripheral portion. Spectacle frame component 5 made of an epoxy resin, which has been molded and suitably cured with an organic dye uniformly dispersed therethroughout, is suitably attached to the shield 1 so that the shield is disposed between the spectacle frame component 5 and the heat source 3.

When the heat source 3 is actuated, it radiates heat energy in about 360°. The conveyor 2 carries the shield with the attached spectacle frame component to move slowly thereabout. While only one shield is illustrated, it should be understood that a number of shields would be attached to the conveyor 2. The heat radiation raises the temperature of the frame components in the regions which are not shielded by the projections 1a of the mask, causing them to reach a temperature above the thermal degradation point of the dye which is employed. Accordingly, the dye in these regions is caused to change color, for example, turning from a dark color to a yellow or becoming colorless. The dye in the regions protected from the radiant heat energy by the projections 1a of the shield retain their original color.

A variable speed control is generally employed for the motor driving the conveyor chain 2 so that the time of revolution of the chain can be set to any desired time interval. In this manner, a single loading and unloading station is used whereat the frame components 5 are loaded and, after one revolution about the heat source 3, are unloaded and replaced with another spectacle frame component. Both the heat output of the heat source 3, and the speed of the conveyor 2 are suitably controlled so that, during one revolution about the heat source, a spectacle frame component 5 is exposed to the precise time-temperature equivalent desired to cause thermal degradation of the organic dye.

Figure 3:
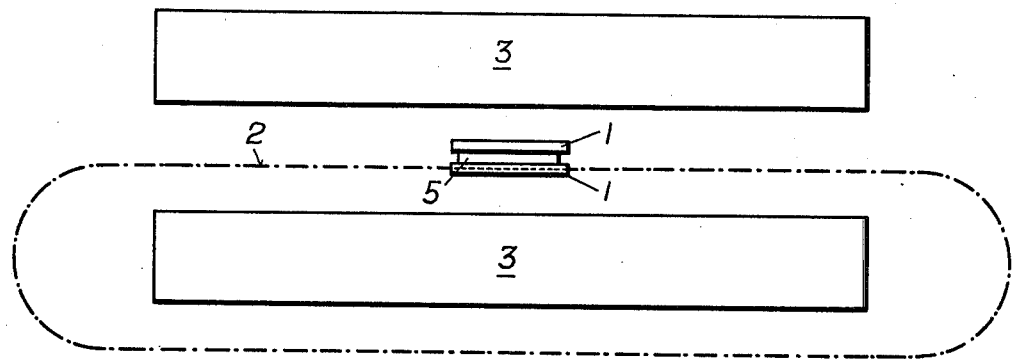
FIG. 3 is a schematic representation of apparatus similar to that shown in FIG. 1.

The apparatus depicted in FIG. 3 is generally similar to that shown in FIG. 1. However, a second heating element 3, which serves another radiation heat source, is provided and disposed so that the conveyor chain 2 travels between the two heat sources. Pairs of shields or masks 1 are provided, and the spectacle frame component 5 is clamped between the two masks. Using this arrangement, the radiant heat energy is applied to the spectacle frame component 5 from both surfaces, resulting in somewhat faster heating of the component. Moreover, if desired, different patterns could be created, each extending inwardly from the opposite surfaces of the spectacle frame component, by varying the number, location, and/or shape of the projections 1a which are provided on the masks 1.

Figure 4:
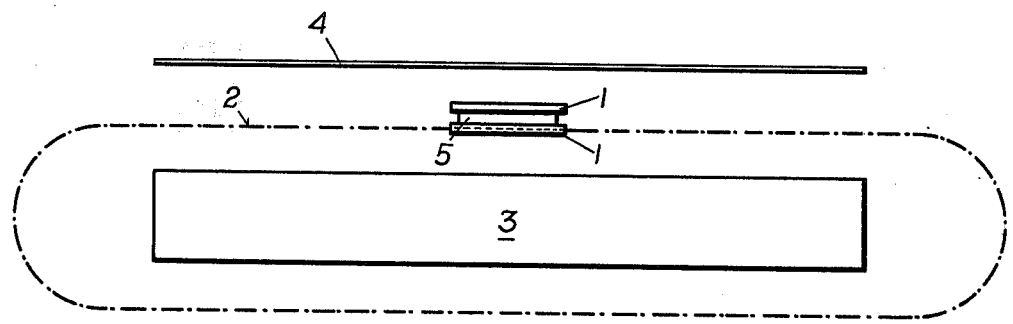
FIG. 4 is a schematic representation of still another apparatus generally similar to that shown in FIG. 1.

The apparatus shown in FIG. 4 is an alternative embodiment of that shown in FIG. 3. Instead of employing a second heating element 3, a reflector 4 is used which reflects the radiant heat energy back to the reverse or opposite side of the spectacle frame component 5 traveling on the conveyor 2. In other respects, the appartus is the same as that shown in FIG. 3 and the foregoing discussion applies equally thereto.

Figure 5:
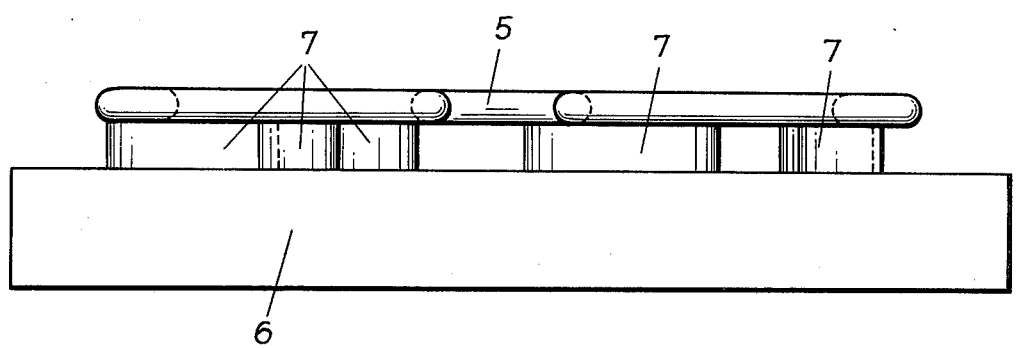
FIG. 5 is an elevation view of apparatus for treating spectacle frames which employs heat conduction, shown with a spectacle frame component in place.
Figure 6:
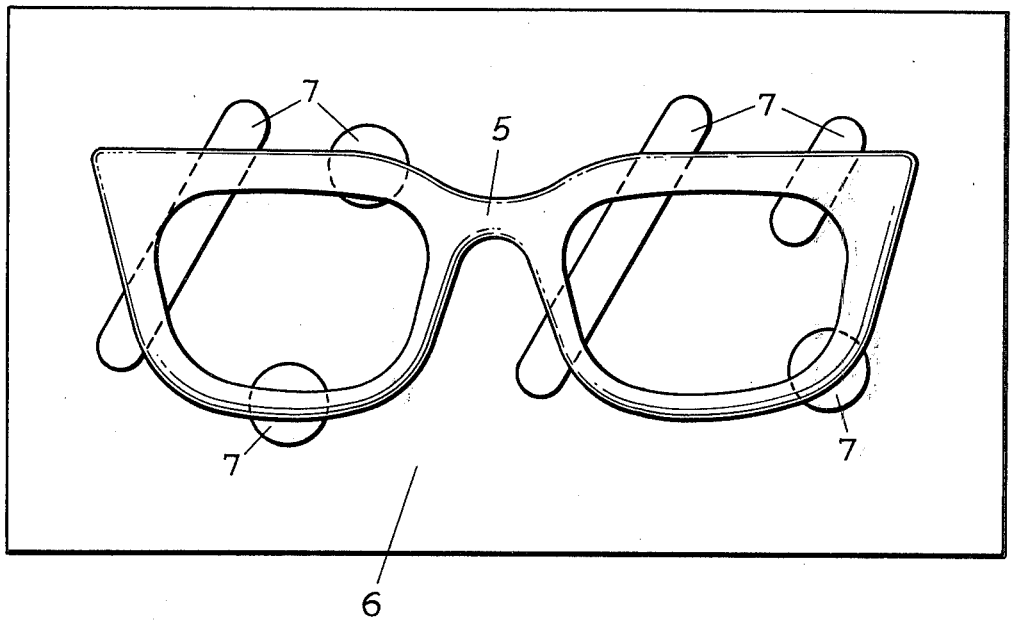
FIG. 6 is a plan view of the device shown in FIG. 5.

The apparatus shown in FIGS. 5 and 6 employs heat conduction to provide localized heating to the frame components in the regions where it is desired that thermal degradation of the dye should occur. A heat source, such as a heating plate 6, is provided having a plurality of upstanding projections 7 which are created with the requisite shape for the particular pattern desired. Illustrated is the lens-holding frame component 5 which rest on the projections 7. At the locations where there is contact with the heated projections 7, the regions of the frame component 5 change color as a result of exposure to the required time-temperature equivalent.

The epoxy resins employed may be any of those commonly used throughout the industry, which have adequate stability when exposed to temperature in the previously indicated range. To provide the desired properties for spectacle frames epoxy resins are generally chosen which are diglycidyl ethers of a polyhydroxy compound, such as Bisphenol-A, i.e., 2, 2-Bis (4-hydroxyphenyl) propane. Other epoxy resins incorporating suitable polyglycoldiepoxides, such as those of ethylene and propylene gylcols, glycerol and 2.3 butanediol, and diglycidyl esters of suitable polycarboxylic acids, such as hexahydrophtalic acid (1,2 cyclohexane-dicarboxylic acid), may also be employed. Suitable curing agents are used to achieve the degree of cross-linking desired in the alternate epoxy resins. Preferably, cylcloaliphatic diamines are used. However, other curing agents well know to the epoxy resin art may be employed, for example, other polyamines, organic polycarboxylic acids and the anhydrides thereof. In general, the particular polyepoxides and the curing agents chosen are chosen primarily because of the physical properties with which they endow the resultant spectacle frame component. In general, the ability to produce a desired pattern using the heat-sensitive dyes is not dependent upon the chemical nature of the epoxy resin, so long as the epoxy resin does not undergo any undesirable chemical or physical reactions at the temperatures to which it will be heated to degrade the organic dye.

The following examples are illustrative of the processes embodying various features of the invention, and they are provided for purposes of illustration and should not be considered to constitute limitations on the invention.

EXAMPLE I

A mixture is made of 100 parts by weight of a polyepoxide, which is a diglycidyl ether of Bisphenol A, having an epoxide equivalent weight of 190 (Epotuf 37-140, a product of the Reichhold Chemical Co.), and 80 parts by weight of Versamid 140, a polyamide having an amine value of about 375 (a product of General Mills, Inc.). An organic dye is added in the amount of 0.2 part by weight of Color-Paste 6012/31, a product of Reichhold Chemie, AG., which is a mixture of a red azo dye (Permanent Red-C.I. 12,310) and a blue azo dye (Caustic or Discharge Blue-C.I. 11,435) and which imparts a purple color to the mixture. The mixture is injected into a mold for a spectacle frame component and is cured at 100° C. for ½ hour.

The cured, solid body is removed from the mold and disposed adjacent a shield having the desired pattern. Apparatus similar to that illustrated in FIG. 1 is used, and the frame component is moved for 5 minutes at a distance of about 5 cm. from radiant heating plates, which are maintained at a temperature of about 400° C. The exposed regions of the spectacle frame component reach a temperature between 180° and 250° C. The purple dye is thermally degraded at about 180° C., and as a result the exposed regions change color to become yellow. Lines of demarcation between the residual purple regions of the frame component and the now yellow-colored regions are sharp. Repetition of this molding and heating process shows that the color pattern obtained is precisely reproducible. The resultant spectacle frame components are attractive in appearance and are considered to be suitable for use as parts of eye glasses.

EXAMPLE II

A mixture is made of 100 parts by weight of a polyepoxide, which is a diglycidyl ether of Bisphenol A having an epoxide equivalent weight of 200, and 30 parts by weight of hexahydrobenzylaminopropylamine (1-cyclohexyl-amino-3-amino propane). A red organic dye is added in the amount of 0.3 part by weight of Bay-Ceresrot BB, (Solvent Red 19-2848 C.I. 26050).

The mixture is injected into a mold for a spectacle frame component and cured at about 105° C. for one hour, and a solid body is removed from the mold.

The component is then disposed adjacent a shield having the desired pattern, as in Example I, and is moved for five minutes at a distance of 5 cm. from radiant heating plates which are maintained at a temperature of about 400° C. The exposed regions of the spectacle frame component reach a temperature between 180° and 230° C. which is sufficient to thermally degrade the red dye and cause the exposed regions to change color to yellow. The lines of demarcation between the residual red regions of the frame component and the now yellow-colored regions are sharp. Repetition of this molding and heating process shows that the color pattern obtained is precisely reproducible. The shielded regions reach about 150° C. during the exposure step which is sufficient to accomplish postcuring of the epoxy resin. The resultant spectacle frame components are attractive in appearance and are considered to be excellently suited for use as parts for eye glasses.

EXAMPLE III

A mixture is made of 100 parts by weight of a polyepoxide, which is a diglycidyl ether of Bisphenol A, having an epoxide equivalent weight of 200, and 55 parts by weight of dimethyldiaminodicyclohexylmethane. A blue organic dye is added in the amount of 0.06 part by weight of S-Xylene Blau As, (Acid Blue 7-1232 CI 42080). The mixture is injected into a mold for a spectacle frame component and cured at about 100° C. for 1 hour, and a solid body is removed from the mold.

The component is then disposed adjacent a shield having the desired pattern, as in Example I, and is moved for three minutes at a distance of 5 cm. from radiant heating plates which are maintained at a temperature of about 400° C. The exposed regions of the spectacle frame component reach a temperature between 150° and 180° C and the shielded regions reach a temperature of about 135°–140° C. which is sufficient to postcure the epoxy resin. The blue dye is thermally degraded, and as a result, the exposed regions change color to yellow. The lines of demarcation between the residual blue regions of the frame component and the now yellow-colored regions are sharp. Repetition of this molding and heating process shows that the color pattern obtained is precisely reproducible. The resultant spectacle frame components are attractive in appearance and are considered to be well suited for use as parts for eye glasses.

EXAMPLE IV

A mixture is made of 100 parts by weight of a polyepoxide, which is a diglycidyl ether of Bisphenol A, having an epoxide equivalent weight of 200, and 25 parts by weight of 1, 2-diaminocyclohexane. A red organic dye is added in the amount of 0.01 part by weight of Sico Maroon BM Light-Siegle-(Pigment Red 58-2746 CI 15825). The mixture is injected into a mold for a spectacle frame component and cured at about 110° C. for two hours. The solid body is removed from the mold.

The component is then disposed adjacent a shield having the desired pattern, as in Example I, and is moved for six minutes at a distance of 5 cm. from radiant heating plates which are maintained at a temperature of about 450° C. The exposed regions of the spectacle frame component reach a temperature between 220° and 250° C. which the shielded portions reach a temperature of about 170°–180° C. which is sufficient to postcure the epoxy resin. The red dye is thermally degraded causing the exposed regions to change color to yellow. The lines of demarcation between the residual red regions of the frame component and the now yellow-colored regions are sharp. Repetition of this molding and heating process shows that the color pattern obtained is precisely reproducible. The resultant spectacle frame components are attractive in appearance and are considered to be well suited for use as parts for eye glasses.

EXAMPLE V

A mixture is made of 30 parts by weight of a polyglycoldiepoxide which is a polymer made from epichlorohydrin and having an epoxide equivalent weight of 300, 70 parts by weight of a polyepoxide based on Bisphenol A, 65 parts by weight of methylhexahydrophthalic acid anhydride, and 2 parts by weight of 2, 4, 6-Tris (dimethylaminomethyl) phenol. A red organic dye is added in the amount of 0.03 part by weight of Bay-Supranol Fast Red BB, (Acid Red 154-1159 CI 24800). The mixture is injected into a mold for a spectacle frame component and cured at about 110° C. for 1½ hours.

The component is then disposed adjacent a shield having the desired pattern, as in Example I, and is moved for ten minutes at a distance of 5 cm. from radiant heating plates which are maintained at a temperature of about 380° C. The exposed regions of the spectacle frame component reach a temperature between 160° and 190° C. and the shielded regions reach a temperature of about 140°–145° C., which is sufficient to postcure the epoxy resin. The red dye is thermally degraded causing the exposed regions to change color to yellow. The lines of demarcation between the residual red regions of the frame component and the now yellow-colored regions are sharp. Repetition of this molding and heating process shows that the color pattern obtained is precisely reproducible. The resultant spectacle frame components are attractive in appearance and are considered to be well suited for use as parts for eye glasses.

EXAMPLE VI

A mixture is made of 100 parts by weight of the diglycidylester of hexahydrophthalic acid, having an epoxide equivalent weight of 175, 100 parts by weight of hexahydrophthalic acid, and 2 parts by weight of 2, 4, 6-Tris (dimethylaminomethyl) phenol. A blue organic dye is added in the amount of two parts by weight of S-Sulfonine Acid Blue B, (Acid Blue 89-1269 CI 13405). The mixture is injected into a mold for a spectacle frame component and cured at about 120° C. for 1½ hours.

The component is then disposed adjacent a shield having the desired pattern, as in Example I, and is moved for six minutes at a distance of 5 cm. from radiant heating plates which are maintained at a temperature of about 400° C. The exposed regions of the spectacle frame component reach a temperature between 180° and 200° C., and the shielded regions reach a temperature of about 145° to 150° C., which is sufficient to postcure the epoxy resin. The blue dye is thermally degraded causing the exposed regions to change color to yellow. The lines of demarcation between the residual blue regions of the frame component and the now yellow-colored regions are sharp. Repetition of this molding and heating process shows that the color pattern obtained is precisely reproducible. The resultant spectacle frame components are attractive in appearance and are considered to be suited for use as parts for eye glasses.

EXAMPLE VII

A mixture is made of 100 parts by weight of a molten polyepoxide, which is a diglycidyl ether of Bisphenol A, having an epoxide equivalent weight of 475, and 30 parts by weight of methyl hexahydrophthalic acid anhydride (methyl HHPA). A blue organic dye is added in the amount of 0.04 part by weight of Coomassie 2RN-ICI-(Acid Blue 113-1280 CI 26360). The mixture is initially heated to about 120° C. and injected into a mold for a spectacle frame component and cured at about 120° C. for one hour.

The component is then disposed adjacent a shield having the desired pattern, as in Example I, and is moved for five minutes at a distance of 5 cm. from radiant heating plates which are maintained at a temperature of about 450° C. The exposed regions of the spectacle frame component reach a temperature between 220° and 250° C., and the shielded regions reach a temperature of about 170° to 180° C., which is sufficient to postcure the epoxy resin. The blue dye is thermally degraded and the exposed regions change color to yellow. The lines of demarcation between the residual blue regions of the frame component and the now yellow-colored regions are sharp. Repetition of this molding and heating process shows that the color pattern obtained is precisely reproducible. The resultant spectacle frame components are attractive in appearance and are considered to be suited for use as parts for eye glasses.

EXAMPLE VIII

A mixture is made of 100 parts by weight of a polyepoxide, which is a diglycidyl ether of Bisphenol A, having an epoxide equivalent weight of about 190, and 32 parts by weight of 1-cyclohexylamino-3-aminopropane. A blue stable organic dye is added in the amount of 0.01 part by weight of Heliogenblue BG, (Pigment Blue 15 CI 74160), together with 0.03 part of PV fast red E3B, (Pigment Red 19 CI 46500). The mixture of the dyes with the epoxide resin and hardener has a violet color. The mixture is injected into a mold for a spectacle frame component and cured at about 100° C. for one hour.

The component is then disposed adjacent a shield having the desired pattern, as in Example I, and is moved for three minutes at a distance of 5 cm. from radiant heating plates which are maintained at a temperature of about 425° C. The exposed regions of the spectacle frame component reach a temperature between 180° and 190° C. The red pigment in the exposed regions is thermally degraded while the stable blue pigment is unaffected, causing the exposed regions to change color from violet to a bluegreen. The shielded regions reach a temperature of about 145° C. which is sufficient to postcure the resin. The lines of demarcation between the residual violet regions of the frame component and the now bluegreen-colored regions are sharp. Repetition of this molding and heating process shows that the color pattern obtained is precisely reproducible. The resultant spectacle frame components are attractive in appearance and are considered to be well suited for use as parts for eye glasses.

EXAMPLE IX

A mixture is made of 100 parts by weight of a polyepoxide, which is a diglycidyl ether of Bisphenol A, having an epoxide equivalent weight of about 190, and 32 parts by weight of 1-cyclohexylamino-3-aminopropane. A blue stable organic dye is added in the amount of 0.03 part by weight of Heliogenblue BG, (Pigment Blue 15 CI 74160), together with 0.04 part of Monolite fast bordeaux, (Pigment Red 12 CI 12385). The mixture of the dyes with the epoxide resin and hardener has a bordeaux color. The mixture is injected into a mold for a spectacle frame component and cured at about 100° C. for one hour.

The component is then disposed adjacent a shield having the desired pattern, as in Example I, and is moved for three minutes at a distance of 5 cm. from radiant heating plates which are maintained at a temperature of about 425° C. The exposed regions of the spectacle frame component reach a temperature between 180° and 190° C. The red pigment in the exposed regions is thermally degraded while the stable blue dye is unaffected, causing the exposed regions to change color from bordeaux to a green. The lines of demarcation between the residual bordeaux regions of the frame component and the now green-colored regions are sharp. Repetition of this molding and heating process shows that the color pattern obtained is precisely reproducible. The resultant spectacle frame components are attractive in appearance and are considered to be well suited for use as parts for eye glasses.

EXAMPLE X

A mixture is made of 100 parts by weight of a polyepoxide, which is a diglycidyl ether of Bisphenol A, having an epoxide equivalent weight of about 190, and 35 parts by weight of 1-cyclohexylamino-3-aminopropane. A mixture of three dyes is used to color the epoxy material, namely: 0.03 part by weight of Heliogengreen GN, (Pigment Green 7 CI 74260), a stable green organic dye; 0.05 part of Xylenblue AS, (Acid Blue 7 CI 42080); and 0.02 part of PV fast red E3B, (Pigment Red 19 CI 46500). The mixture of the dyes with the epoxide resin and hardener has a red-brown color. The mixture is injected into a mold for a spectacle frame component and cured at about 100° C. for one hour.

The component is then disposed adjacent a shield having a desired first pattern, as in Example I, and is moved for three minutes at a distance of 5 cm. from radiant heating plates which are maintained at a temperature of about 425° C. The exposed regions of the spectacle frame component reach a temperature between 180° and 190° C. the red and blue dyes in the exposed regions are thermally degraded while the stable green dye is unaffected, thus resulting in a yellow-green color in these regions.

A shield having a second pattern is then substituted, and the component is moved for about three minutes at a distance of 5 cm. from radiant heating plates which are maintained at a temperature of about 400° C. The exposed regions of the spectacle frame component reach a temperture of about 165° C. The red dye is generally stable at this temperature while the blue dye in the exposed regions is thermally degraded, causing the newly exposed regions which are shielded by the first pattern to change to a grey color. The lines of demarcation between the three different-colored regions of the frame component are sharp. Repetition of this molding and heating process shows that the color pattern obtained is precisely reproducible. The resultant spectacle frame components are attractive in appearance and are considered to be well suited for use as parts for eye glasses.

EXAMPLE XI

A mixture is made of 100 parts by weight of a polyepoxide, which is a diglycidyl ether of Bisphenol A, having an epoxide equivalent weight of about 190, and 35 parts by weight of 1-cyclohexylamino-3-aminopropane. A mixture of three materials is used to color the epoxy material, namely: 0.3 part by weight of a stable white $TiO_2$ pigment; 0.2 part of Xylenblue AS, (Acid Blue 7 CI 42080); and 0.01 part of Sudanred 7B, (Solvent Red 19 CI 26050). The mixture of these coloring materials in the proportions employed when combined with the epoxide resin and hardener has a blue color. The mixture is injected into a mold for a spectacle frame component and cured at about 100° C. for one hour.

The frame component is then disposed adjacent a shield having a desired first pattern, as in Example I, and is moved for three minutes at a distance of 5 cm. from radiant heating plates which are maintained at a temperature of about 425° C. The exposed regions of the spectacle frame component reach a temperature between 180° and 190° C. The red and blue dyes in the exposed regions are thermally degraded while the stable inorganic pigment is unaffected, resulting in a yellow color in these exposed regions.

A shield having a second pattern is then substituted, and the frame component is moved for about three minutes at a distance of 5 cm. from radiant heating plates which are maintained at a temperature of about 400° C. The exposed regions of the spectacle frame component reach a temperature of about 165° C. The red dye is generally stable at this temperature while the blue dye in the exposed regions is thermally degraded, causing the newly exposed regions which were shielded by the first pattern to change to a red color. The lines of demarcation between the three different-colored regions of the frame component are sharp. Repetition of this molding and heating process shows that the color pattern obtained is precisely reproducible. The resultant spectacle frame components are attractive in appearance and are considered to be well suited for use as parts for eye glasses.

EXAMPLE XII

A mixture is made of 100 parts by weight of a polyepoxide, which is a diglycidyl ether of Bisphenol A, having an epoxide equivalent weight of about 190, and 35 parts by weight of 1-cyclohexylamino-3-aminopropane. A mixture of three dyes is used to color the epoxy material, namely: 0.06 part by weight of Monolite fast yellow 2RS, a stable yellow organic dye, i.e., Pigment Yellow 1 (CI 11680); 0.05 part of Xylenblue AS, (Acid Blue 7 CI 42080; and 0.03 part of Sudanred 7B, (Solvent Red 19 CI 26050). The mixture of the dyes with the epoxide resin and hardener has a reddish black color. The mixture is injected into a mold for a spectacle frame component and cured at about 100° C. for one hour.

The frame component is then disposed adjacent a shield having a desired first pattern, as in Example I, and is moved for three minutes at a distance of 5 cm. from radiant heating plates which are maintained at a temperature of about 425° C. The exposed regions of the spectacle frame component reach a temperature between 180° and 190° C. The red and blue dyes in the exposed regions are thermally degraded and both change to yellow, while the stable yellow dye is unaffected, thus resulting in a yellow color in these regions.

A shield having a second pattern is then substituted, and the frame component is moved for about three minutes at a distance of 5 cm. from radiant heating plates which are maintained at a temperature of about 400° C. The exposed regions of the spectacle frame component reach a temperature of about 165° C. The red dye is generally stable at this temperature while the blue dye in the exposed regions is thermally degraded, causing the newly exposed regions which were shielded by the first pattern to change to a red color. The lines of demarcation between the three different-colored regions of the frame component are sharp. Repetition of this molding and heating process shows that the color pattern obtained is precisely reproducible. The resultant spectacle frame components are attractive in appearance and are considered to be well suited for use as parts for eye glasses.

The invention provides processes which are suitable for production line techniques for making spectacle frame components having precisely reproducible color patterns. Various of the features of the invention are set forth in the appended claims.

What is claimed is:

1. A process for making spectacle frame components having reproducible color patterns, which process comprises forming a molding composition from a polyepoxide, a curing agent therefor and a monoazo or diazo dye of a certain color, which dye is thermally degradable at a temperature between about 140° C. and about 250° C., filling a spectacle frame component mold with said composition with said dye being distributed three-dimensionally therethroughout, curing said composition in said mold to produce a solid shaped body, and subjecting said cured solid body to differential heating in accordance with a first predetermined pattern to expose portions of said body to a temperature between about 140° C. and about 250° C. for a sufficient time to cause said exposed portions to undergo a distinct change in color from said certain color to a different color, thereby producing a predetermined three-dimensional color pattern throughout said molded spectacle frame component.

2. A process in accordance with claim 1 wherein said heating is carried out radiantly.

3. A process in accordance with claim 1 wherein said heating is carried out by convection.

4. A process in accordance with claim 1 wherein said heating is carried out by conduction.

5. A process in accordance with claim 1 wherein said differential heating is carried out by immersing said bodies in a heated liquid.

6. A process in accordance with claim 5 wherein said liquid is selected from the group consisting of mineral oil, vegetable oils, asphalt, silicones, molten metals, glycols and glycerol.

7. A process in accordance with claim 1 wherein two different colored dyes are included in said molding composition which dyes are thermally degradable at different temperatures and wherein said frame component is subjected to differential heating in accordance with a second pattern at a temperature sufficient to cause one of said thermally degradable dyes to change color while said other dye retains its color.

8. A process for making spectacle frame components having reproducible color patterns, which process comprises forming a molding composition from a polyepoxide, a curing agent therefor and an organic dye of a certain color, which dye is thermally degradable at a temperature between about 140° C. and about 250° C., said dye being selected from the group of dyes consisting of Solvent Red 19, Acid Red 68, Pigment Violet 19, Acid Blue 7, Acid Blue 89, Acid Red 154, Pigment Red 7, Pigment Red 58, Acid Blue 113, Acid Brown 2, Pigment Red 31 and Pigment Red 12, filling a spectacle frame component mold with said composition with said dye being distributed three-dimensionally therethroughout, curing said composition in said mold to produce a solid shaped body, and subjecting said cured solid body to differential heating in accordance with a first predetermined pattern to expose portions of said body to a first temperature between about 140° C. and about 250° C. to cause said exposed portions to undergo a distinct change in color from said certain color to a different color, thereby producing a predetermined three-dimensional color pattern throughout said molded spectacle frame component.

9. A process in accordance with claim 8 wherein two dyes of different colors from said group are included in said molding composition, said dyes being thermally degradable at different temperatures within said temperature range and wherein said frame component is subjected to differential heating in accordance with a second pattern at a temperature lower than said first temperature but sufficient to cause one of said thermally degradable dyes to change color while said other dye retains its certain color.

10. A process in accordance with claim 8 wherein said polyepoxide is a glycidal ether of Bisphenol A and is substantially unaffected by said heating to said first temperature to cause said distinct change in color in said thermally degradable dye.

11. A method of coloring epoxy resin eyeglass frames and parts thereof manufactured from liquid ingredients, an epoxy composition and a hardener, comprising the steps of adding small amounts of a coloring agent selected from azo dyes and pigmenting material to at least one of the liquid ingredients prior to casting the liquid ingredients, metering the liquids into a mold having cavities therein in the form of eyeglass frames and parts thereof, completely curing the liquid ingredients and included coloring agent in the mold to produce a self-sustaining, completely polymerized colored eyeglass frames or parts thereof, removing the colored polymerized eyeglass frames or parts thereof from the mold, and subjecting selected portions of the colored polymerized eyeglass frames or parts thereof to heat to chemically bleach selected areas of the frame and parts thereof to produce demi-shades in the colored polymerized eyeglass frames or parts thereof.

12. A method of coloring epoxy resin eyeglass frames and parts thereof manufactured from liquid ingredients, including an epoxy composition and a hardener, comprising the steps of adding small amounts of a coloring agent in the form of a heat-sensitive organic dye to at least one of the liquid ingredients prior to casting the liquid ingredients, filling a mold having cavities in the form of eyeglass frames or parts thereof with said liquid ingredients, curing said colored liquid ingredients in said mold to produce self-sustaining colored eyeglass frames or parts thereof, removing said colored eyeglass frames or parts thereof from the mold, and subjecting selected portions of said colored eyeglass frames or parts thereof to heat to chemically bleach selected areas of said frames or parts thereof to produce a reproducible demi-shade pattern therein.

13. A method in accordance with claim 12 wherein said organic dye is an azo dye.

14. A method in accordance with claim 13 wherein said chemical bleaching occurs as a result of heating said azo dye to a temperature not higher than about 300° C.

15. A method in accordance with claim 12 wherein said chemical bleaching occurs as a result of heating said coloring agent to a temperature of between about 150° C. and about 300° C.

* * * * *